US011302110B2

(12) United States Patent
Hayakawa et al.

(10) Patent No.: US 11,302,110 B2
(45) Date of Patent: Apr. 12, 2022

(54) PEDESTRIAN ACTION RECOGNITION AND LOCALIZATION USING RGB IMAGES

(71) Applicant: Honda Motor Co., Ltd., Tokyo (JP)

(72) Inventors: Jun Hayakawa, Sunnyvale, CA (US); Behzad Dariush, San Ramon, CA (US)

(73) Assignee: Honda Motor Co., Ltd., Tokyo (JP)

( * ) Notice: Subject to any disclaimer, the term of this patent is extended or adjusted under 35 U.S.C. 154(b) by 274 days.

(21) Appl. No.: 16/805,607

(22) Filed: Feb. 28, 2020

(65) Prior Publication Data

US 2021/0271866 A1   Sep. 2, 2021

(51) Int. Cl.
*G06V 40/10*   (2022.01)
*G06N 3/02*   (2006.01)
*G06V 20/52*   (2022.01)
*G06V 20/58*   (2022.01)

(52) U.S. Cl.
CPC .............. *G06V 40/10* (2022.01); *G06N 3/02* (2013.01); *G06V 20/52* (2022.01); *G06V 20/58* (2022.01)

(58) Field of Classification Search
None
See application file for complete search history.

(56) References Cited

U.S. PATENT DOCUMENTS

| | | | |
|---|---|---|---|
| 2018/0024562 A1* | 1/2018 | Bellaiche | G06T 7/73 701/26 |
| 2019/0283746 A1* | 9/2019 | Shalev-Shwartz | B60W 50/14 |

OTHER PUBLICATIONS

Alahi et al., "Social LSTM: Human Trajectory Prediction in Crowded Spaces", IEEE Conference on Computer Vision and Pattern Recognition (CVPR), Jun. 2016, pp. 961-971.
Bertoni et al., "MonoLoco: Monocular 3D Pedestrian Localization and Uncertainty Estimation", EPFL VITA lab, CH-1015 Lausanne, Aug. 2019, 11 pages.
Chen et al., "3D Object Proposals For Accurate Object Class Detection", Curran Associates Inc., Advances in Neural Information Processing Systems 28, 2015, pp. 424-432.
Chen et al., "Monocular 3D Object Detection for Autonomous Driving", IEEE Conference on Computer Vision and Pattern Recognition (CVPR), Jun. 2016, pp. 2147-2156.
Geiger et al., "Vision Meets Robotics: The KITTI Dataset", International Journal of Robotics Research (IJRR), 2013, 6 pages.

(Continued)

*Primary Examiner* — Matthew C Bella
*Assistant Examiner* — Brian D Shin
(74) *Attorney, Agent, or Firm* — Kubota & Basol LLP

(57) ABSTRACT

In some examples, a first set of image data is received, the first set of image data corresponding to images of a first type and being of a person in an environment of a vehicle and including a first plurality of images of the person over a time interval. In some examples, a second set of image data is received, the second set of image data corresponding to images of a second type and being of the person in the environment of the vehicle and including a second plurality of images of the person over the time interval. In some examples, the first set of image data and the second set of image data are processed to determine a recognized action of the person, which includes using a first neural network to determine the recognized action of the person.

20 Claims, 3 Drawing Sheets

(56) References Cited

OTHER PUBLICATIONS

Godard et al., "Unsupervised Monocular Depth Estimation with Left-Right Consistency", Available Online at: <http://visual.cs.ucl.ac.uk/pubs/monoDepth/>, Sep. 2016, 14 pages.

Güler et al., "DensePose: Dense Human Pose Estimation In The Wild", In Proceedings of the IEEE Conference on Computer Vision and Pattern Recognition, 2018, pp. 7297-7306.

Gupta et al., "Social GAN: Socially Acceptable Trajectories with Generative Adversarial Networks", Mar. 2018, 10 pages.

He et al., "Mask R-CNN", Facebook AI Research (FAIR), Jan. 2018, 12 pages.

Kotseruba et al., "Joint Attention in Autonomous Driving (JAAD)", Apr. 2017, 10 pages.

Kreiss et al., "PifPaf: Composite Fields For Human Pose Estimation", In The IEEE Conference on Computer Vision and Pattern Recognition (CVPR), Jun. 2019, 10 pages.

Li et al., "Actional-Structural Graph Convolutional Networks for Skeleton-based Action Recognition", CVPR, Apr. 2019, 12 pages.

Liu et al., "CBNet: A Novel Composite Backbone Network Architecture for Object Detection", Wangxuan Institute of Computer Technology, Peking University, Department of Computer Science, Stony Brook University, Sep. 2019, 8 pages.

Liu et al., "SSD: Single Shot MultiBox Detector", Springer International Publishing AG, ECCV 2016, Part I, LNCS 9905, 2016, pp. 21-37.

Loper et al., "SMPL: A Skinned Multi-Person Linear Model", ACM Transactions on Graphics, vol. 34, No. 6, Oct. 2015, pp. 1-16.

Ramanishka et al., "Toward Driving Scene Understanding: A Dataset For Learning Driver Behavior And Causal Reasoning", In Conference on Computer Vision and Pattern Recognition, 2018, 9 pages.

Rasouli et al., "Pedestrian Action Anticipation Using Contextual Feature Fusion In Stacked RNNs", BMVC, 2019, 13 pages.

Redmon et al., "YOLOv3: An Incremental Improvement", University of Washington, Apr. 2018, 6 pages.

Liu et al., "High-Level Semantic Feature Detection: A New Perspective For Pedestrian Detection", In IEEE Conference an Computer Vision and Pattern Recognition (CVPR), 2019, pp. 5187-5196.

Si et al., "An Attention Enhanced Graph Convolutional LSTM Network for Skeleton-Based Action Recognition", Mar. 2019, 10 pages.

Toshev et al., "DeepPose: Human Pose Estimation via Deep Neural Networks ", IEEE Conference on Computer Vision and Pattern Recognition, 2014, pp. 1653-1660.

Wang et al., "Temporal Segment Networks: Towards Good Practices for Deep Action Recognition", Aug. 2016, 16 pages.

Wei et al., "Convolutional Pose Machines", CVPR, 2016, 9 pages.

Wojke et al., "Simple Online And Realtime Tracking With A Deep Association Metric", IEEE International Conference an Image Processing (ICIP), 2017, pp. 3645-3649.

Yan et al., "Spatial Temporal Graph Convolutional Networks for Skeleton-Based Action Recognition", Department of Information Engineering, The Chinese University of Hong Kong, Jan. 2018, 10 pages.

Yang et al., "3D Human Pose Estimation in the Wild by Adversarial Learning", IEEE/CVF Conference on Computer Vision and Pattern Recognition, 2018, pp. 5255-5264.

Zhang, "CityPersons: A Diverse Dataset for Pedestrian Detection", Feb. 2017, 12 pages.

Zheng et al., "Mars: A Video Benchmark For Large-Scale Person Re-Identification", In Computer Vision—ECCV 2016, Sep. 2016, pp. 868-884.

Zhou et al., "Temporal Relational Reasoning in Videos", Jul. 2018, 16 pages.

Zhu et al., "StarNet: Pedestrian Trajectory Prediction using Deep Neural Network in Star Topology", Jun. 2019, 6 pages.

* cited by examiner

PEDESTRIAN ACTION RECOGNITION AND LOCALIZATION USING RGB IMAGES

FIELD OF THE DISCLOSURE

This disclosure relates generally to image recognition, and more particularly to recognizing an action and/or determining a location of a person in one or more images.

BACKGROUND OF THE DISCLOSURE

Autonomous and semi-autonomous vehicle operation has become more prevalent. Various systems are currently in use in different vehicles for determining characteristics about environments of the vehicles based on which computers in the vehicles can adjust operation of the vehicles (e.g., identifying a stop sign, and autonomously stopping the vehicle at the stop sign). Identifying pedestrian actions and/or locations in the environment of vehicle may be important aspects of autonomous and semi-autonomous vehicle operation.

SUMMARY

The examples of this disclosure are directed to systems and processes for recognizing pedestrian actions and/or estimating pedestrian locations or distances from a vehicle using images captures from a monocular camera (e.g., a single RGB camera mounted to the vehicle). Correctly recognizing pedestrian action and/or location can lead to improved future trajectory determinations for the pedestrian (e.g., a prediction as to where the pedestrian will be at one or more times in the near future), which can be used to provide autonomous or semi-autonomous vehicle control by a vehicle control system, because the vehicle control system can better understand the likely future location of the pedestrian.

DETAILED DESCRIPTION

In the following description, reference is made to the accompanying drawings which form a part hereof, and in which it is shown by way of illustration specific examples that can be practiced. It is to be understood that other examples can be used and structural changes can be made without departing from the scope of the examples of the disclosure.

The examples of this disclosure are directed to systems and processes for recognizing pedestrian actions and/or estimating pedestrian locations or distances from a vehicle using images captures from a monocular camera (e.g., a single RGB camera mounted to the vehicle). Correctly recognizing pedestrian action and/or location can lead to improved future trajectory determinations for the pedestrian (e.g., a prediction as to where the pedestrian will be at one or more times in the near future), which can be used to provide autonomous or semi-autonomous vehicle control by a vehicle control system, because the vehicle control system can better understand the likely future location of the pedestrian. For example, a correct prediction that a pedestrian is currently looking both ways on a street can be a strong indication that the pedestrian is about to attempt to cross the street rather than remaining still on the sidewalk or walking along the sidewalk. Therefore, some examples of the disclosure provide for improved pedestrian action recognition and/or pedestrian location estimation using one or more neural networks. Further, using stereo cameras for capturing and processing images of the environment of a vehicle can be more expensive (e.g., cost, processing resources, etc.) than using a single monocular camera for doing so. Therefore, some examples of the disclosure provide for using a single monocular camera for the above-mentioned pedestrian action recognition and/or location estimation.

Figure 1:
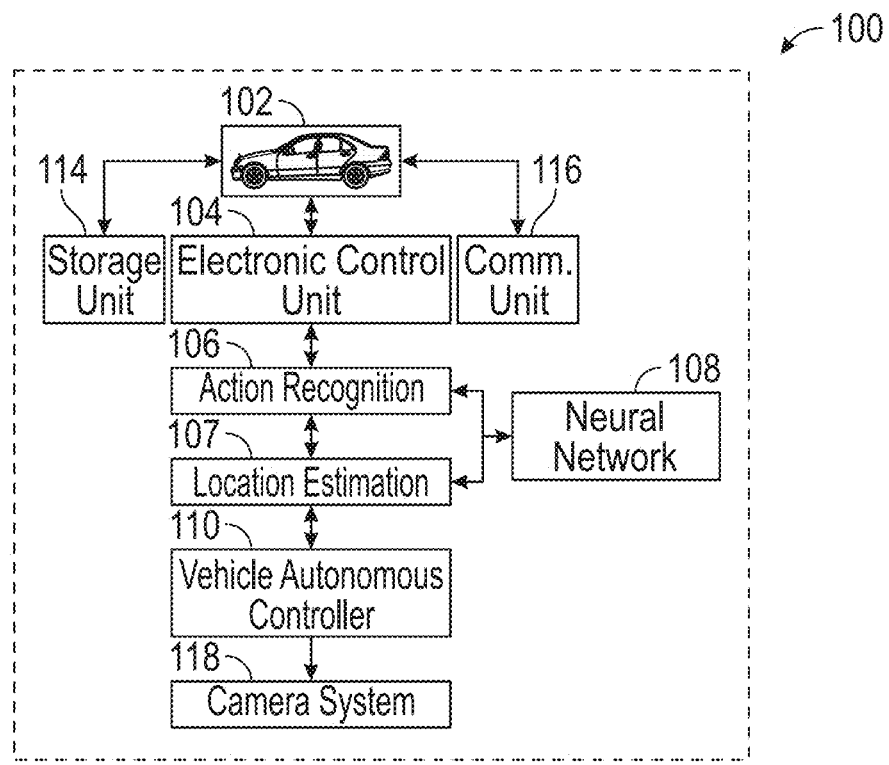
FIG. 1 is a schematic view of an exemplary system for implementing pedestrian action recognition and pedestrian location estimation according to examples of the disclosure.

FIG. 1 is a schematic view of an exemplary system 100 for implementing pedestrian action recognition and pedestrian location estimation according to examples of the disclosure. The components of the system 100, as well as the components of other systems, hardware architectures, and software architectures discussed herein, can be combined, omitted, or organized into different architectures for various examples.

Generally, the system 100 can include a vehicle 102 with an electronic control unit (ECU) 104 that executes one or more applications, operating systems, vehicle systems and subsystem user interfaces, among others. The ECU 104 can also execute a pedestrian action recognition application 106 and/or a pedestrian location estimation application 107 that are configured to recognize actions of one or more pedestrians in an environment of the vehicle 102 during semi-autonomous/autonomous operation of the vehicle 102, and estimate locations of one or more pedestrians in an environment of the vehicle 102 during semi-autonomous/autonomous operation of the vehicle 102, which will be described in more detail below.

In some examples, the action recognition 106 and location estimation 107 applications can be configured to utilize one or more neural networks 108 to execute machine learning/deep learning models what will be described later. In some examples, the action recognition 106 and location estimation 107 applications can be configured to recognize pedestrian actions and estimate pedestrian locations during semi-autonomous/autonomous operation of the vehicle 102 by a vehicle autonomous controller 110 of the vehicle 102. In some examples, the vehicle autonomous controller 110 can be configured to alter the semi-autonomous/autonomous operation of one or more driving functions of the vehicle 102 (e.g., braking, turning, acceleration, etc.) based on the results of the action recognition 106 and/or location estimation 107 applications.

The ECU 104 of the vehicle 102 can execute one or more applications—including action recognition 106 and location estimation 107 applications—operating systems, vehicle systems and subsystem executable instructions, among others. In some examples, the ECU 104 can include a respective microprocessor, one or more application-specific integrated circuit(s) (ASIC), or other similar devices. The ECU 104 can also include respective internal processing memory, an interface circuit, and bus lines for transferring data, sending commands, and communicating with the plurality of components of the vehicle 102. The ECU 104 can also include a respective communication device (not shown) for sending data internally to components of the vehicle 102 and communicating with externally hosted computing systems (e.g., external to the vehicle 102).

In an exemplary embodiment, the ECU 104 can additionally communicate with a storage unit 114 (e.g., memory, such as a computer-readable storage medium that stores instructions for the various functions or applications implemented by the system 100) to execute one or more applications, operating systems, vehicle systems and subsystem user interfaces, and the like that are stored on the storage unit 114. In one or more embodiments, the storage unit 114 can be accessed by the action recognition application 106 and/or the location estimation application 107 to store data, for example, one or more images of a surrounding environment of the vehicle 102, one or more sets of locational coordinates (e.g., GPS/DGPS coordinates), and/or vehicle dynamic data associated with dynamic vehicle parameters of the vehicle 102.

In some examples, the ECU 104 can be configured to communicate with the vehicle autonomous controller 110 of the vehicle 102 to execute autonomous driving commands to operate the vehicle 102 to autonomously control one or more driving functions of the vehicle 102. The one or more driving functions can include, but are not limited to, steering, braking, accelerating, merging, turning, coasting, and the like. In some examples, the action recognition application 106 and/or location estimation application 107 can communicate with the vehicle autonomous controller 110 to control an autonomous operation of one or more driving functions of the vehicle 102. In some examples, the action recognition application 106 and/or location estimation application 107 can be configured to communicate with the vehicle autonomous controller 110 to provide autonomous operation of one or more driving functions of the vehicle 102 to account for one or more external factors that can include, but are not limited to, road/pathway conditions of a road/pathway on which the vehicle 102 is traveling, a lane in which the vehicle 102 is traveling, status of traffic signals, traffic patterns, traffic regulations, pedestrian actions in an environment of the vehicle, pedestrian locations in an environment of the vehicle, etc.

In some examples, the ECU 104 can additionally be configured to operably control a camera system 118 of the vehicle 102. The camera system 118 can include one or more cameras (not shown) that are positioned at one or more positions on or in the vehicle 102 to capture images of at least the external surrounding environment of the vehicle 102 (e.g., a predetermined area located around (such as front/side/behind) the vehicle 102).

In particular, the one or more cameras that are positioned in or on the vehicle can be configured to capture images of pedestrians in an environment of the vehicle 102 to be analyzed by the action recognition 106 and location estimation 107 applications. In some examples, the one or more cameras can be configured to capture images of the pedestrians and transmit respective image data to the action recognition application 106 and/or location estimation application 107. The action recognition application 106 can be configured to process the image data to recognize actions of one or more pedestrians in an environment of the vehicle 102, as will be described later. The location estimation application 107 can be configured to process the image data to estimate locations (e.g., orientations, positions and/or distances) of one or more pedestrians in an environment of the vehicle 102, as will be described later.

In some examples, the one or more cameras that are positioned to capture the external surrounding environment of the vehicle 102 can be disposed at one or more external front portions of the vehicle 102. The one or more cameras of the camera system 118 can be disposed at external front portions of the vehicle 102, including, but not limited to different portions of the vehicle bumper, vehicle front lighting units, vehicle fenders, and the windshield. In some examples, the one or more cameras can be configured as RGB cameras that can capture RGB bands that are configured to capture rich information about object appearance, as well as relationships and interactions between the vehicle 102 and objects (e.g., pedestrians) within the surrounding environment of the vehicle 102.

In some examples, the one or more cameras can be monocular cameras, outputs from each of which can be analyzed by action recognition application 106 and/or location estimation application 107. The camera system 118 can be configured to convert one or more RGB images/videos (e.g., sequences of images) into image data that is communicated to the action recognition application 106 and/or location estimation application 107 to be analyzed. While the action recognition application 106, location estimation application 107 and neural networks 108 are shown as being executed by ECU 104, it is understood that in some examples, one or more of these are executed by a processor other than ECU 104. Further, in some examples, one or more of action recognition application 106, location estimation application 107 and neural networks 108 can be executed on a remote server (e.g., with one or more processors and memory), which can communicate with ECU 104 via communications unit 116, via which ECU 104 can transmit and/or receive appropriate information for proper operation of action recognition application 106 and/or location estimation application 107. Further, action recognition application 106 and location estimation application 107 can be part of a single application, or can be separate applications.

Figure 2:
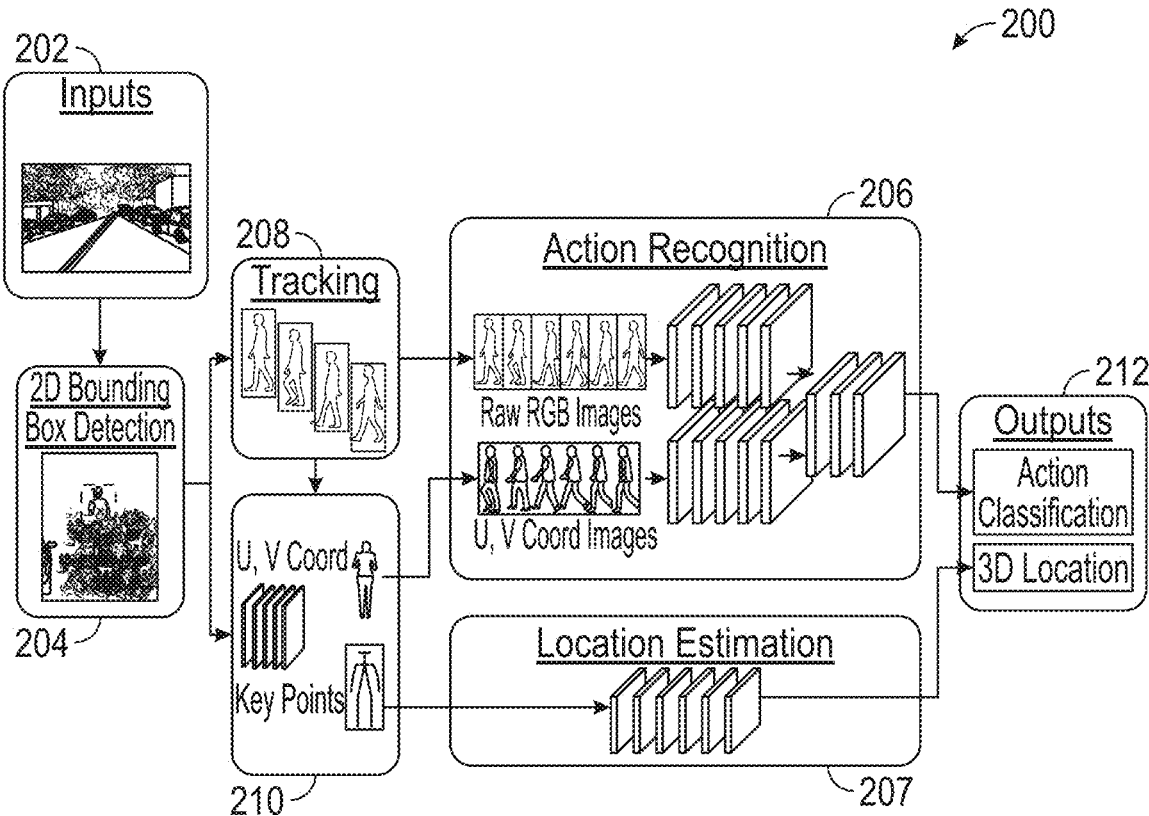
FIG. 2 illustrates an example process of a system for performing pedestrian action recognition and/or location estimation according to examples of the disclosure.

FIG. 2 illustrates an example process 200 of a system for performing pedestrian action recognition and/or location estimation according to examples of the disclosure. Various aspects of process 200 can be implemented by components of FIG. 1, as described previously and below. At 202, inputs can be received by the system (e.g., system 100). The inputs can be RGB images (e.g., images based on an additive color model in which red, green, and blue light are added together in different amounts to reproduce different colors) captured by a camera in communication with camera system 118 in FIG. 1. In some examples, the RGB images can be raw RGB images. In some examples, the camera can be a single monocular camera. In some examples, the RGB images can include a video (e.g., the RGB images can be sequential images in a time-sequence of images, or selected images (e.g., every other, every third, etc.) from the sequential images captured by the camera). In some examples, the RGB images can be of an environment of the vehicle, such as images of a section of road in front of the vehicle. In some examples, the RGB images can include one or more pedestrians, in addition to other objects such as other vehicles, buildings, traffic signs, cross-walks, traffic lights, roads, etc. It is understood that while process 200 will be described with reference to a single monocular camera and a single pedestrian, process 200 can analogously be performed for each pedestrian in images from the single monocular camera, and can be analogously performed for each camera of a plurality of single monocular cameras (e.g., if the vehicle has multiple monocular cameras that capture different portions of the external environment of the vehicle, such as the front portion of the environment, the rear portion of the environment, etc.).

The RGB images from 202 can be processed at 204 to identify bounding boxes that surround respective pedestrians in the images (e.g., each identified pedestrian can be surrounded by its own bounding box). In some examples, machine learning and/or deep learning (e.g., utilizing neural network(s) 108) can be used to detect two-dimensional bounding boxes around each pedestrian in the RGB images. For example, algorithms such as YOLO V3, SSD and/or Mask R-CNN can be used to detect objects in the RGB images. Algorithms such as CBNet using ResNeXt as a backbone network for feature extraction from the RGB images can be used. CSP can be used to detect two-dimensional bounding boxes for each pedestrian in the RGB images. In some examples, the two-dimensional bounding boxes can be determined even if one or more of their body parts are occluded. In some examples, the CSP model can be trained using an appropriate dataset, such as by the City Person dataset, which can be stored in storage unit 114, for example. Other algorithms and/or training data can similarly be used to achieve similar results (i.e., to determine bounding boxes around each pedestrian in the RGB images).

At 208, pedestrian tracking can be performed. Pedestrian tracking can be performed using the two-dimensional bounding boxes identified at 204. The location, movement and/or size—and/or changes in the location, movement and/or size—of a given bounding box can be used to track the pedestrian corresponding to the bounding box from one RGB image to the next. This tracking can be performed at 208 for each pedestrian in the RGB images. In some examples, DeepSort (e.g., utilizing a convolutional neural network (CNN) in neural networks 108) can be used as the tracking algorithm, which can track pedestrians based on the identified two-dimensional bounding boxes (e.g., identified using CSP). In some examples, DeepSort is particularly well-suited for use with CSP bounding box detection, because CSP is able to perform well with partially occluded pedestrians. In some examples, the DeepSort CNN can be trained on a large-scale person re-identification dataset (e.g., stored in storage unit 114). In some examples, a different tracking algorithm can be used. Other algorithms and/or training data can similarly be used to achieve similar results.

Figure 3A:
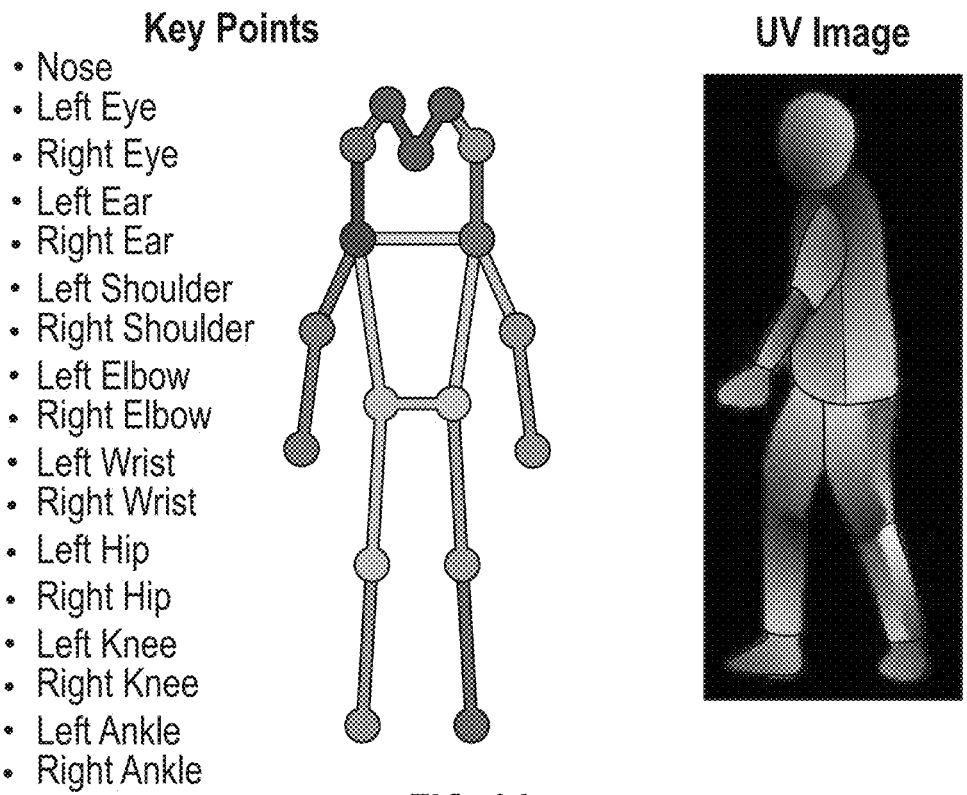
FIG. 3A illustrates example key points and U,V images determined for pedestrians according to examples of the disclosure.

At 210, the pose of a pedestrian (e.g., a representation of the orientation of a person in a graphical format) can be estimated from the RGB images that have the two-dimensional bounding box for that pedestrian identified from 204. Pose estimation can be performed at 210 for each pedestrian with a bounding box in the RGB images. The outputs of the pose estimation can be one or more key points identified for that pedestrian in image coordinates (e.g., in the X,Y coordinates of the RGB image) and images of a plurality of parts of the surface of the body of the pedestrian in surface coordinates (e.g., in U,V coordinates of a Skinned Multi-Person Linear (SMPL) model of a person), such as shown in FIG. 3A. For example, for each RGB image (e.g., frame of video) of the RGB images, and for each pedestrian in those RGB images, one or more key points for that pedestrian can be identified, and an image, in U,V coordinates, of a plurality of parts of the surface of the body of the pedestrian can be generated.

In some examples, the key points generated can be one or more of the location—in the X,Y coordinates of the RGB images—of the pedestrian's: nose; left eye; right eye; left ear; right ear; left shoulder; right shoulder; left elbow; right elbow; left wrist; right wrist; left hip; right hip; left knee; right knee; left ankle; and right ankle. In some examples, the U,V images of the parts of the pedestrian can be colored images of 24 (or 6, 12, 18, 30, 36, etc.) parts of the pedestrian's body surface based on the SMPL model.

In some examples, the key points and/or U,V images can be determined using one or more neural networks 108. In some examples, DensePose can be used to determine the key points and the U,V images. For example, a DensePose network(s) can be used to generate the U,V images of the pedestrian from the RGB images of the pedestrian (e.g., by transforming pixels from the input image to U,V space based on DensePose detections), and DensePose can predict U,V coordinates of 24 body parts of the SMPL body model. In some examples, an auxiliary network(s) can be used to determine the key points of the pedestrian. In some examples, the U,V images of the pedestrian can be generated concurrently with the determination of the key points of the pedestrian. In some examples, a different algorithm, such as PifPaf, can be used to generate the key points of the pedestrian.

At 206, the action of the pedestrian for which the two-dimensional bounding box was identified at 204 can be recognized and provided as an output at 212. Action recognition can be performed at 206 for each pedestrian with a bounding box in the RGB images. The details of how the action recognition can be performed will be described with reference to FIG. 3B.

At 207, the location of the pedestrian for which the two-dimensional bounding box was identified at 204 can be recognized. Location estimation can be performed at 207 for each pedestrian with a bounding box in the RGB images. For example, for each image in the RGB images, the location of each pedestrian in each RGB image can be estimated. The location (e.g., distance from vehicle 102) of a given pedestrian for a given RGB image (e.g., corresponding to a given RGB image) can be estimated using one or more neural networks 108 (e.g., a probabilistic feed-forward network) taking, as inputs, the key points of the pedestrian determined at 210. In some examples, the location estimation 207 can provide as outputs for each image in the RGB images the estimated distance from the vehicle of each pedestrian in the RGB image, and in some examples the associated ambiguity for the estimated distance of each pedestrian in the RGB image.

In some examples, the location estimation 207 can be performed using a MonoLoco network (in neural network(s) 108). The effect of pixel errors in locations of key points determined at 210 can vary with the distance to the pedestrian in question. For example, for pedestrians that are closer to the vehicle 102 (and thus, the capturing monocular camera), the effect of pixel errors for the key points for that pedestrian on the estimated distance for that pedestrian can be relatively low; however, for pedestrians that are further away from the vehicle 102, the effect of pixel errors for key points for that pedestrian on the estimated distance for that pedestrian can be relatively high. Therefore, in some examples, estimated distance errors are not distributed symmetrically or uniformly as a function of true distance from the vehicle 102. Rather, in some examples, the estimated distance errors can be distributed asymmetrically or non-uniformly as a function of the true distance from the vehicle 102 (e.g., more/greater errors can be expected for distances further away from the vehicle 102). To address this fact, the location estimation network(s) 108 can be trained using an asymmetrical loss function to represent the aleatoric uncertainty of distance estimations using monocular images, which can improve the location estimation for pedestrians further away from the vehicle 102 as compared with use of a symmetrical loss function. In some examples, the loss function can be based on a negative log-likelihood of an asymmetrical distribution. In some examples, the asymmetrical distribution can be a Johnson SU distribution. For example, an example loss function $L_j(x|\gamma, \delta, \lambda, \xi)$ can be represented as:

$$L_J(x \mid \gamma, \delta, \lambda, \xi) = (\gamma + \delta \sinh^{-1} z)^2 - \log(\delta) + \log\left(\frac{1}{\lambda \sqrt{2\pi} \sqrt{z^2+1}}\right)$$

where:

$$z = \frac{x - \xi}{\lambda}$$

where x can be the true distance of the pedestrian from the camera/vehicle. In some examples, $\{\gamma, \delta, \lambda, \xi\}$ can be parameters practiced/learned by the location estimation network(s) 108, and can be the estimated distance of the given pedestrian provided as an output at 212. In some examples, the estimated distance and the determined X,Y location of the pedestrian in the RGB images (e.g., determined at 204, 208 and/or 210) can be used together to estimate the location (e.g., distance and orientation) of the pedestrian as an output at 212. In some examples, the neural network(s) 108 of location estimation 207 can be trained using the KITTI dataset (e.g., stored in storage unit 114), though other suitable training datasets can also be used.

In some examples, vehicle autonomous controller 110 can use one or more of the action recognition and location estimation outputs 212 to control and/or adjust the operation of the vehicle 102, as previously described.

Figure 3B:
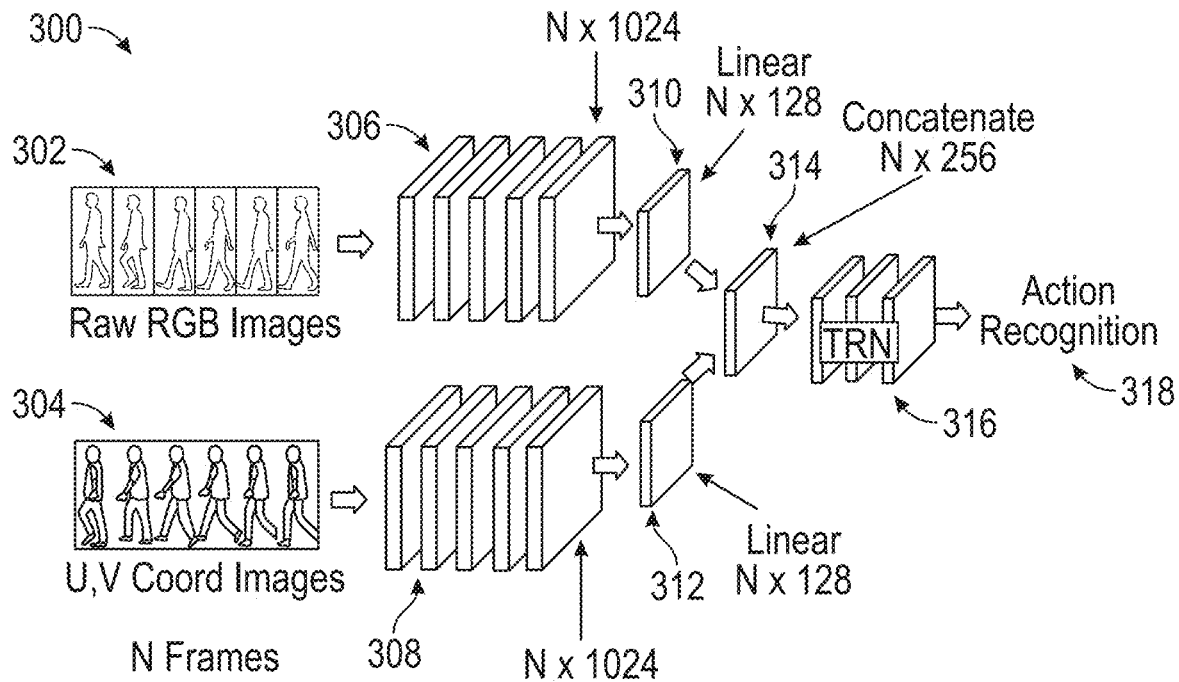
FIG. 3B illustrates an exemplary action recognition system for recognizing the action of a pedestrian in RGB images captured by a monocular camera according to some examples of the disclosure.

Example details of action recognition 206 will now be described with reference to FIG. 3B. FIG. 3B illustrates an exemplary action recognition system 300 for recognizing the action of a pedestrian in RGB images captured by a monocular camera according to some examples of the disclosure. As previously described with reference to FIG. 2, the action recognition system 300 can receive, as inputs, a sequence of RGB images 302 (e.g., part of a video) of a given pedestrian in an environment of the vehicle 102. In some examples, the sequence of RGB images can be a predetermined number (N) of images, such as 4, 8, 12 or 24 images. In some examples, the sequence of RGB images can be cropped according to the bounding boxes determined for the pedestrian in each RGB image at 204 in FIG. 2 (e.g., to exclude parts of the image outside of the bounding boxes determined for the pedestrian). In some examples, the RGB images may not be cropped (e.g., this may include parts of the image outside of the bounding boxes determined for the pedestrian). The action recognition system 300 can also receive, as inputs, a sequence of U,V images 304 (e.g., corresponding to the RGB images 302, and including the same number of images as the RGB images 302) of the given pedestrian as generated at 210 in FIG. 2. In some examples, the U,V images 304 can be similarly cropped according to the bounding boxes determined for the pedestrian at 204 in FIG. 2.

Action recognition system can include a first neural network 306 and a second neural network 308 (e.g., included in neural network(s) 108). The first neural network 306 can be configured to extract features from the N RGB images 302 according to an algorithm, and the second neural network 308 can be configured to extract features from the N U,V images 304 according to an algorithm. In some examples, the first neural network 306 can be a convolutional neural network (CNN), and the second neural network 308 can be a CNN, though it is understood that networks 306 and 308 can similarly be other networks that are configured to extract features from images. In some examples, networks 306 and 308 can utilize Inception with Batch Normalization (e.g., used for normalizing the value distribution of the outputs of a given layer in the networks before proceeding into the next layer in the networks). In some examples, networks 306 and 308 can be pre-trained using an appropriate feature extraction dataset (e.g., stored in storage unit 114), such as ImageNet. Accordingly, network 306 can receive, as inputs, the sequence of N RGB images 302 of the pedestrian, and network 308 can receive, as inputs, the sequence of N U,V images 304 of the pedestrian. Network 306 can output the extracted features from the N RGB images 302 (e.g., 1024 features for each of the N RGB images 302, 512 features for each of the N RGB images 302, 2048 features for each of the N RGB images 302, etc.). Network 308 can output the extracted features from the N U,V images 304 (e.g., 1024 features for each of the N U,V images 302, 512 features for each of the N U,V images 302, 2048 features for each of the N U,V images 302, etc.).

In some examples, the outputs from networks 306 and 308 can be inputted into linear layers 310 and 312, respectively. Linear layers 310 and 312 can be included in neural network(s) 108. In some examples, linear layers 310 and 312 can include feedforward neural networks that are trained to learn (e.g., average) relationships between inputs and outputs of the linear layers 310 and 312. For example, in FIG. 3B, linear layer 310 can be configured to reduce the number of features identified by network 306 to a subset of those features and/or a lower number of different quantities or values determined from the features identified by network 306. For example, in FIG. 3B, the linear layer 310 receives the 1024 features identified for each of the N RGB images by network 306, and outputs 128 (or 64, or 256, etc.) quantities for each of the N RGB images that correspond to the N RGB images. The linear layer 312 similarly outputs 128 (or 64, or 256, etc.) quantities for each of the N U,V images that correspond to the N U,V images.

Action recognition system 300 can also include a combining layer 314 configured to combine the outputs of linear layers 310 and 312. In some examples, combining layer 314 can perform a concatenation on the outputs of linear layers 310 and 312 (e.g., simply taking the values outputted by the linear layers 310 and 312, and concatenating them for each of the N RGB/U,V images). Thus, in some examples, the output of the combining layer 314 can have a dimension of 256 (if the dimensions of the outputs of the linear layers 310 and 312 are each 128; 128 if the dimensions of the outputs of the linear layers 310 and 312 are each 64; etc.) for each of the N RGB/U,V images. Other manners of combining the outputs of linear layers 310 and 312 are possible. Further, in some examples, linear layers 310 and 312 may not be utilized, in which case combining layer 314 can combine, in various ways, the outputs of networks 306 and 308.

The output of combing layer 314 can be inputted to the action recognition network 316. The action recognition network 316 can be included in neural network(s) 108. In some examples, the action recognition network 316 can be a temporal relation network, which can be a neural network designed to learn and reason about temporal dependencies between video frames (e.g., images in a sequence of images), in some examples at multiple time scales. In some examples, the action recognition network 316 can be another neural network that has been trained to recognize/classify pedestrian actions in accordance with the disclosure. The structure of an example action recognition network can be defined as follows:

$$T_N(V) = h'_\emptyset \left( \sum_{i<j\ldots<N} g'_\Theta(f_i, f_j \ldots, f_N) \right)$$

where N can be the total number of frames of video (e.g., RGB images) captured by the monocular camera, and f can be the output of combining layer 314 for the $i^{th}$ frame (e.g., the $i^{th}$ RGB image and the $i^{th}$ U,V image). $h'_\emptyset$ and $g'_\Theta$ can be fusing functions that fuse the features of their inputs (e.g., input "frames" $f_i$). In some examples, $h'_\emptyset$ and $g'_\Theta$ can be implemented as multilayer perceptrons (MLP) in the action recognition network 316 with parameters $\emptyset$ and $\Theta$, respectively, that can be trained during training. In order to capture temporal relations between the input "frames" $f_i$ at multiple time scales, the following composite function can be used in the action recognition network 316 to accumulate frame relations at different time scales:

$$MT_N(V) = T_2(V) + T_3(V) + \ldots T_N(V)$$

Each term $T_d$ can capture the temporal relationship between d "frames" $f_i$. Further, in some examples, each $T_d$ can have its own separate $h'_\emptyset{}^d$ and $g'_\Theta{}^d$.

In some examples, the output 318 of action recognition network 316 can be one or more recognized actions (or probabilities of recognized actions) or action classifications (or probabilities of action classifications) for one or more pedestrians in the RGB images 302. The output 318 can change as time progresses, and as more RGB images are analyzed, as the pedestrian(s) change their behavior. Thus, in some examples, process 200 in FIG. 2 (and thus system 300 in FIG. 3B) can be continuously performed on a predetermined number of RGB images captured by a single monocular camera; in some examples, process 200 can be performed on a sliding window (subset) of the images as time progresses, and in some examples, process 200 can instead be performed on sequential, non-overlapping, sets of those images as time progresses.

In some examples, networks 306, 308, 310, 312 and/or 316 can be trained together using a training dataset stored in storage unit 114, and in some examples, networks 306, 308, 310, 312 and/or 316 can be trained separately using training datasets stored in storage unit 114. Various datasets can be used for training the action recognition network 316 and/or networks 306, 308, 310 and 312. For example, the JAAD dataset (e.g., stored in storage unit 114) can be used, though other suitable training datasets can also be used that correlate sequential images of pedestrians with determined actions for those pedestrians.

Figure 4:
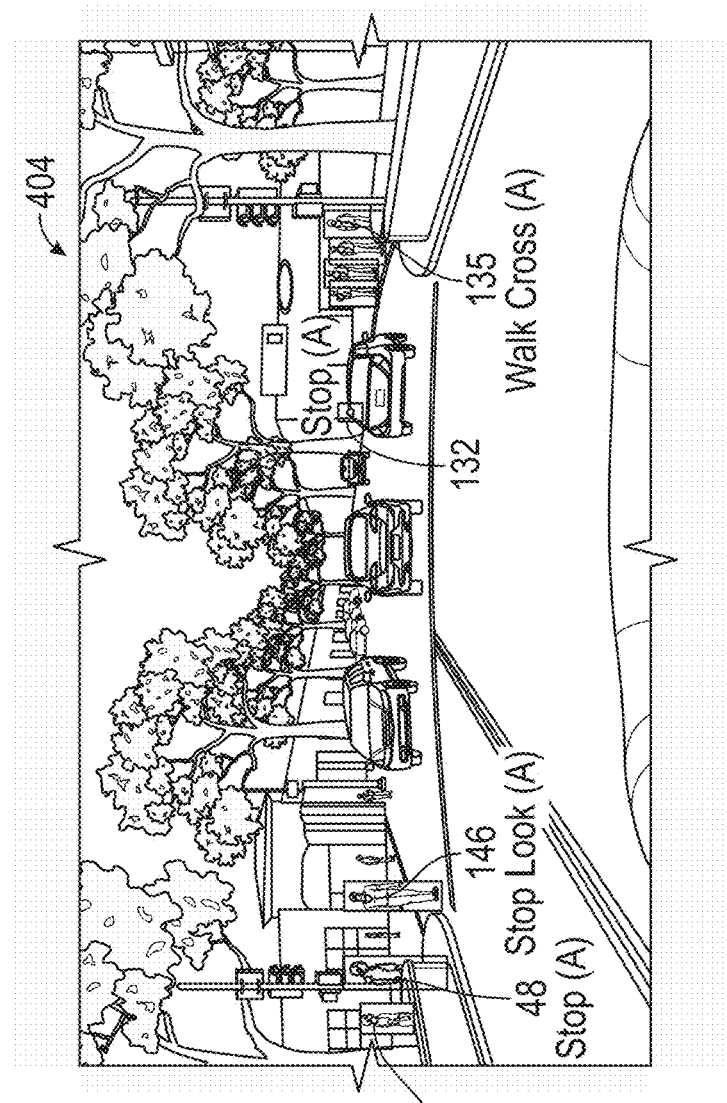
FIG. 4 illustrates example results of the action recognition and location estimation process and system shown in FIG. 2 according to examples of the disclosure.

FIG. 4 illustrates example results of process 200 according to examples of the disclosure. For example, the locations in X and Z (e.g., with respect to vehicle 102) of pedestrians in an environment of the vehicle 102 can be estimated, as shown in plot 402. X equal to zero can correspond to a forward center line of vehicle 102 such that a negative X value can indicate a degree of offset to the left of the center line of the vehicle 102, and a positive X value can indicate a degree of offset to the right of the center line of the vehicle 102. Z equal to zero can correspond to the location of the vehicle 102 (e.g., front of the vehicle), and a positive Z value can indicate a perpendicular, forward distance from the location of the vehicle 102. As shown in plot 402, the locations of pedestrians 48, 132, 135, 146 and 149 have been estimated. View 404 indicates the same pedestrians in a camera-eye view as captured by a forward-facing monocular camera on vehicle 102 (e.g., the camera from which the pedestrian locations were estimated, and the pedestrian actions were recognized).

Further, the actions of pedestrians 48, 132, 135 and 146 can also have been recognized. For example, process 200 has recognized that pedestrian 146 is performing a "stop and look" action, that pedestrian 48 is performing a "stop" action, that pedestrian 132 is performing a "stop" action, and that pedestrian 135 is performing a "walk crosswalk" action. Based on these actions, vehicle controller 110 can control/adjust the autonomous or semi-autonomous operation of vehicle 102 appropriately.

Therefore, according to the above, some examples of this disclosure are directed to a method comprising, at an electronic device with one or more processors and memory, receiving a first set of image data, the first set of image data corresponding to images of a first type and being of a person in an environment of a vehicle, and the images of the first type including a first plurality of images of the person over a time interval; receiving a second set of image data, the second set of image data corresponding to images of a second type, different from the first type, and being of the person in the environment of the vehicle, and the images of the second type including a second plurality of images of the person over the time interval; and processing the first set of image data and the second set of image data to determine a recognized action of the person, wherein the processing includes using a first neural network to determine the recognized action of the person based on the first set of image data and the second set of image data. Additionally or alternatively to one or more of the above examples, in some examples, the images of the first type and the images of the second type are generated from outputs of a single monocular camera. Additionally or alternatively to one or more of the above examples, in some examples, the images of the first type are two-dimensional RGB images of the person, and the images of the second type are U,V images of a plurality of parts of a surface of a body of the person. Additionally or alternatively to one or more of the above examples, in some examples, the method further comprises processing the images of the first type using a second neural network to generate the first set of image data, the first set of image data comprising one or more features extracted by the second neural network from the first plurality of images; and processing the images of the second type using a third neural network to generate the second set of image data, the second set of image data comprising one or more features extracted by the third neural network from the second plurality of images. Additionally or alternatively to one or more of the above examples, in some examples, the first neural network is of a different type than the second neural network and the third neural network. Additionally or alternatively to one or more of the above examples, in some examples, the first neural network is a temporal relation network, and the second neural network and the third neural network are convolutional neural networks. Additionally or alternatively to one or more of the above examples, in some examples, processing the first set of image data and the second set of image data comprises: providing the first set of image data as an input to a first linear layer to generate a processed first set of image data; and providing the second set of image data as an input to a second linear layer to generate a processed second set of image data, wherein the first neural network determines the recognized action of the person based on the processed first set of image data and the processed second set of image data. Additionally or alternatively to one or more of the above examples, in some examples, processing the first set of image data and the second set of image data comprises: combining the processed first set of image data and the processed second set of image data, and providing the combined processed first set of image data and the processed second set of image data as an input to the first neural network to determine the recognized action of the person. Additionally or alternatively to one or more of the above examples, in some examples, the method further comprises autonomously adjusting operation of the vehicle based on the recognized action of the person. Additionally or alternatively to one or more of the above examples, in some examples, the images of the first type are images that have been cropped to a bounding box surrounding the person, and the images of the second type are images that have been cropped to the bounding box surrounding the person. Additionally or alternatively to one or more of the above examples, in some examples, the method further comprises receiving a first set of key points data of the person in the environment of the vehicle; and processing the first set of key points data to determine an estimated distance of the person from the vehicle, wherein the processing of the first set of key points data includes processing the first set of key points data using a second neural network utilizing a regression process and trained based on an asymmetrical loss function. Additionally or alternatively to one or more of the above examples, in some examples, the asymmetrical loss function reflects an asymmetrical distribution of estimated distance errors as a function of a true distance of a respective person from the vehicle. Additionally or alternatively to one or more of the above examples, in some examples, the asymmetrical loss function is a Johnson SU loss function. Additionally or alternatively to one or more of the above examples, in some examples, the first set of image data, the second set of image data, and the first set of key points data are generated from images outputted from a single monocular camera. Additionally or alternatively to one or more of the above examples, in some examples, the method further comprises autonomously adjusting operation of the vehicle based on the estimated distance of the person.

Some examples of the disclosure are directed to a non-transitory computer-readable storage medium storing instructions, which when executed by an electronic device with one or more processors, cause the electronic device to perform a method comprising: receiving a first set of image data, the first set of image data corresponding to images of a first type and being of a person in an environment of a vehicle, and the images of the first type including a first plurality of images of the person over a time interval; receiving a second set of image data, the second set of image data corresponding to images of a second type, different from the first type, and being of the person in the environment of the vehicle, and the images of the second type including a second plurality of images of the person over the time interval; and processing the first set of image data and the second set of image data to determine a recognized action of the person, wherein the processing includes using a first neural network to determine the recognized action of the person based on the first set of image data and the second set of image data. Additionally or alternatively to one or more of the above examples, in some examples, the images of the first type and the images of the second type are generated from outputs of a single monocular camera. Additionally or alternatively to one or more of the above examples, in some examples, the images of the first type are two-dimensional RGB images of the person, and the images of the second type are U,V images of a plurality of parts of a surface of a body of the person. Additionally or alternatively to one or more of the above examples, in some examples, the method further comprises processing the images of the first type using a second neural network to generate the first set of image data, the first set of image data comprising one or more features extracted by the second neural network from the first plurality of images; and processing the images of the second type using a third neural network to generate the second set of image data, the second set of image data comprising one or more features extracted by the third neural network from the second plurality of images. Additionally or alternatively to one or more of the above examples, in some examples, the first neural network is of a different type than the second neural network and the third neural network. Additionally or alternatively to one or more of the above examples, in some examples, the first neural network is a temporal relation network, and the second neural network and the third neural network are convolutional neural networks. Additionally or alternatively to one or more of the above examples, in some examples, processing the first set of image data and the second set of image data comprises: providing the first set of image data as an input to a first linear layer to generate a processed first set of image data; and providing the second set of image data as an input to a second linear layer to generate a processed second set of image data, wherein the first neural network determines the recognized action of the person based on the processed first set of image data and the processed second set of image data. Additionally or alternatively to one or more of the above examples, in some examples, processing the first set of image data and the second set of image data comprises: combining the processed first set of image data and the processed second set of image data, and providing the combined processed first set of image data and the processed second set of image data as an input to the first neural network to determine the recognized action of the person. Additionally or alternatively to one or more of the above examples, in some examples, the method further comprises autonomously adjusting operation of the vehicle based on the recognized action of the person. Additionally or alternatively to one or more of the above examples, in some examples, the images of the first type are images that have been cropped to a bounding box surrounding the person, and the images of the second type are images that have been cropped to the bounding box surrounding the person. Additionally or alternatively to one or more of the above examples, in some examples, the method further comprises receiving a first set of key points data of the person in the environment of the vehicle; and processing the first set of key points data to determine an estimated distance of the person from the vehicle, wherein the processing of the first set of key points data includes processing the first set of key points data using a second neural network utilizing a regression process and trained based on an asymmetrical loss function. Additionally or alternatively to one or more of the above examples, in some examples, the asymmetrical loss function reflects an asymmetrical distribution of estimated distance errors as a function of a true distance of a respective person from the vehicle. Additionally or alternatively to one or more of the above examples, in some examples, the asymmetrical loss function is a Johnson SU loss function. Additionally or alternatively to one or more of the above examples, in some examples, the first set of image data, the second set of image data, and the first set of key points data are generated from images outputted from a single monocular camera. Additionally or alternatively to one or more of the above examples, in some examples, the method further comprises autonomously adjusting operation of the vehicle based on the estimated distance of the person.

Some examples of the disclosure are directed to an electronic device comprising: one or more processors; and memory storing instructions, which when executed by the one or more processors, cause the electronic device to perform a method comprising: receiving a first set of image data, the first set of image data corresponding to images of a first type and being of a person in an environment of a vehicle, and the images of the first type including a first plurality of images of the person over a time interval; receiving a second set of image data, the second set of image data corresponding to images of a second type, different from the first type, and being of the person in the environment of the vehicle, and the images of the second type including a second plurality of images of the person over the time interval; and processing the first set of image data and the second set of image data to determine a recognized action of the person, wherein the processing includes using a first neural network to determine the recognized action of the person based on the first set of image data and the second set of image data. Additionally or alternatively to one or more of the above examples, in some examples, the images of the first type and the images of the second type are generated from outputs of a single monocular camera. Additionally or alternatively to one or more of the above examples, in some examples, the images of the first type are two-dimensional RGB images of the person, and the images of the second type are U,V images of a plurality of parts of a surface of a body of the person. Additionally or alternatively to one or more of the above examples, in some examples, the method further comprises processing the images of the first type using a second neural network to generate the first set of image data, the first set of image data comprising one or more features extracted by the second neural network from the first plurality of images; and processing the images of the second type using a third neural network to generate the second set of image data, the second set of image data comprising one or more features extracted by the third neural network from the second plurality of images. Additionally or alternatively to one or more of the above examples, in some examples, the first neural network is of a different type than the second neural network and the third neural network. Additionally or alternatively to one or more of the above examples, in some examples, the first neural network is a temporal relation network, and the second neural network and the third neural network are convolutional neural networks. Additionally or alternatively to one or more of the above examples, in some examples, processing the first set of image data and the second set of image data comprises: providing the first set of image data as an input to a first linear layer to generate a processed first set of image data; and providing the second set of image data as an input to a second linear layer to generate a processed second set of image data, wherein the first neural network determines the recognized action of the person based on the processed first set of image data and the processed second set of image data. Additionally or alternatively to one or more of the above examples, in some examples, processing the first set of image data and the second set of image data comprises: combining the processed first set of image data and the processed second set of image data, and providing the combined processed first set of image data and the processed second set of image data as an input to the first neural network to determine the recognized action of the person. Additionally or alternatively to one or more of the above examples, in some examples, the method further comprises autonomously adjusting operation of the vehicle based on the recognized action of the person. Additionally or alternatively to one or more of the above examples, in some examples, the images of the first type are images that have been cropped to a bounding box surrounding the person, and the images of the second type are images that have been cropped to the bounding box surrounding the person. Additionally or alternatively to one or more of the above examples, in some examples, the method further comprises receiving a first set of key points data of the person in the environment of the vehicle; and processing the first set of key points data to determine an estimated distance of the person from the vehicle, wherein the processing of the first set of key points data includes processing the first set of key points data using a second neural network utilizing a regression process and trained based on an asymmetrical loss function. Additionally or alternatively to one or more of the above examples, in some examples, the asymmetrical loss function reflects an asymmetrical distribution of estimated distance errors as a function of a true distance of a respective person from the vehicle. Additionally or alternatively to one or more of the above examples, in some examples, the asymmetrical loss function is a Johnson SU loss function. Additionally or alternatively to one or more of the above examples, in some examples, the first set of image data, the second set of image data, and the first set of key points data are generated from images outputted from a single monocular camera. Additionally or alternatively to one or more of the above examples, in some examples, the method further comprises autonomously adjusting operation of the vehicle based on the estimated distance of the person.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A method comprising:
at an electronic device with one or more processors and memory:
receiving a first set of image data, the first set of image data corresponding to images of a first type and being of a person in an environment of a vehicle, and the images of the first type including a first plurality of images of the person over a time interval;
receiving a second set of image data, the second set of image data corresponding to images of a second type, different from the first type, and being of the person in the environment of the vehicle, and the images of the second type including a second plurality of images of the person over the time interval; and
processing the first set of image data and the second set of image data to determine a recognized action of the person, wherein the processing includes using a first neural network to determine the recognized action of the person based on the first set of image data and the second set of image data.

2. The method of claim 1, wherein the images of the first type and the images of the second type are generated from outputs of a single monocular camera.

3. The method of claim 1, wherein the images of the first type are two-dimensional RGB images of the person, and the images of the second type are U,V images of a plurality of parts of a surface of a body of the person.

4. The method of claim 1, further comprising:
processing the images of the first type using a second neural network to generate the first set of image data, the first set of image data comprising one or more features extracted by the second neural network from the first plurality of images; and
processing the images of the second type using a third neural network to generate the second set of image data, the second set of image data comprising one or more features extracted by the third neural network from the second plurality of images.

5. The method of claim 4, wherein the first neural network is of a different type than the second neural network and the third neural network.

6. The method of claim 5, wherein the first neural network is a temporal relation network, and the second neural network and the third neural network are convolutional neural networks.

7. The method of claim 4, wherein processing the first set of image data and the second set of image data comprises:
providing the first set of image data as an input to a first linear layer to generate a processed first set of image data; and
providing the second set of image data as an input to a second linear layer to generate a processed second set of image data,
wherein the first neural network determines the recognized action of the person based on the processed first set of image data and the processed second set of image data.

8. The method of claim 7, wherein processing the first set of image data and the second set of image data comprises:
combining the processed first set of image data and the processed second set of image data, and providing the combined processed first set of image data and the processed second set of image data as an input to the first neural network to determine the recognized action of the person.

9. The method of claim 1, further comprising:
autonomously adjusting operation of the vehicle based on the recognized action of the person.

10. The method of claim 1, wherein the images of the first type are images that have been cropped to a bounding box surrounding the person, and the images of the second type are images that have been cropped to the bounding box surrounding the person.

11. The method of claim 1, further comprising:
receiving a first set of key points data of the person in the environment of the vehicle; and
processing the first set of key points data to determine an estimated distance of the person from the vehicle, wherein the processing of the first set of key points data includes processing the first set of key points data using a second neural network utilizing a regression process and trained based on an asymmetrical loss function.

12. The method of claim 11, wherein the asymmetrical loss function reflects an asymmetrical distribution of estimated distance errors as a function of a true distance of a respective person from the vehicle.

13. The method of claim 12, wherein the asymmetrical loss function is a Johnson SU loss function.

14. The method of claim 11, wherein the first set of image data, the second set of image data, and the first set of key points data are generated from images outputted from a single monocular camera.

15. The method of claim 11, further comprising:
autonomously adjusting operation of the vehicle based on the estimated distance of the person.

16. A non-transitory computer-readable storage medium storing instructions, which when executed by an electronic device with one or more processors, cause the electronic device to perform a method comprising:
receiving a first set of image data, the first set of image data corresponding to images of a first type and being of a person in an environment of a vehicle, and the images of the first type including a first plurality of images of the person over a time interval;
receiving a second set of image data, the second set of image data corresponding to images of a second type, different from the first type, and being of the person in the environment of the vehicle, and the images of the second type including a second plurality of images of the person over the time interval; and
processing the first set of image data and the second set of image data to determine a recognized action of the person, wherein the processing includes using a first neural network to determine the recognized action of the person based on the first set of image data and the second set of image data.

17. The computer-readable storage medium of claim 16, the method further comprising:
receiving a first set of key points data of the person in the environment of the vehicle; and
processing the first set of key points data to determine an estimated distance of the person from the vehicle, wherein the processing of the first set of key points data includes processing the first set of key points data using a second neural network utilizing a regression process and trained based on an asymmetrical loss function.

18. An electronic device comprising:
one or more processors; and
memory storing instructions, which when executed by the one or more processors, cause the electronic device to perform a method comprising:
receiving a first set of image data, the first set of image data corresponding to images of a first type and being of a person in an environment of a vehicle, and the images of the first type including a first plurality of images of the person over a time interval;
receiving a second set of image data, the second set of image data corresponding to images of a second type, different from the first type, and being of the person in the environment of the vehicle, and the images of the second type including a second plurality of images of the person over the time interval; and
processing the first set of image data and the second set of image data to determine a recognized action of the person, wherein the processing includes using a first neural network to determine the recognized action of the person based on the first set of image data and the second set of image data.

19. The electronic device of claim 18, the method further comprising:
receiving a first set of key points data of the person in the environment of the vehicle; and processing the first set of key points data to determine an estimated distance of the person from the vehicle, wherein the processing of the first set of key points data includes processing the first set of key points data using a second neural network utilizing a regression process and trained based on an asymmetrical loss function.

20. The electronic device of claim 18, wherein the images of the first type are two-dimensional RGB images of the person, and the images of the second type are U,V images of a plurality of parts of a surface of a body of the person.

* * * * *